A. J. BOYLE.
JOINT FOR CONCRETE PIPE.
APPLICATION FILED JULY 23, 1919.

1,345,829.  Patented July 6, 1920.

Inventor:
Albert J. Boyle,
by Spear, Middleton, Donaldson & Hall
Atty's

UNITED STATES PATENT OFFICE.

ALBERT J. BOYLE, OF BALTIMORE, MARYLAND.

JOINT FOR CONCRETE PIPE.

1,345,829. Specification of Letters Patent. Patented July 6, 1920.

Application filed July 23, 1919. Serial No. 312,719.

*To all whom it may concern:*

Be it known that I, ALBERT J. BOYLE, a citizen of the United States, resident of Baltimore, Maryland, have invented certain new and useful Improvements in Joints for Concrete Pipe, of which the following is a specification.

My invention is designed to provide a joint for concrete pipe which will give assurance against leakage as this is a very serious objection with this class of pipe and has resulted in the loss of millions of gallons of water per day when used as a water pipe.

My aim is to provide an expansion joint which will absolutely assure freedom from leakage; be very simple in construction; easily applied and readily accessible for connection, disconnection or tightening.

Figure 1:
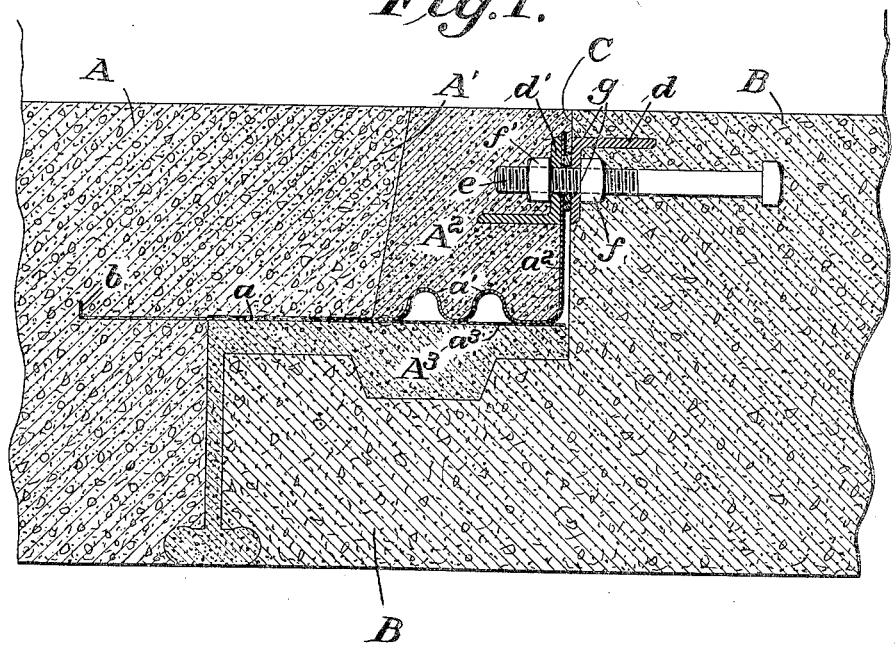
Figure 2:
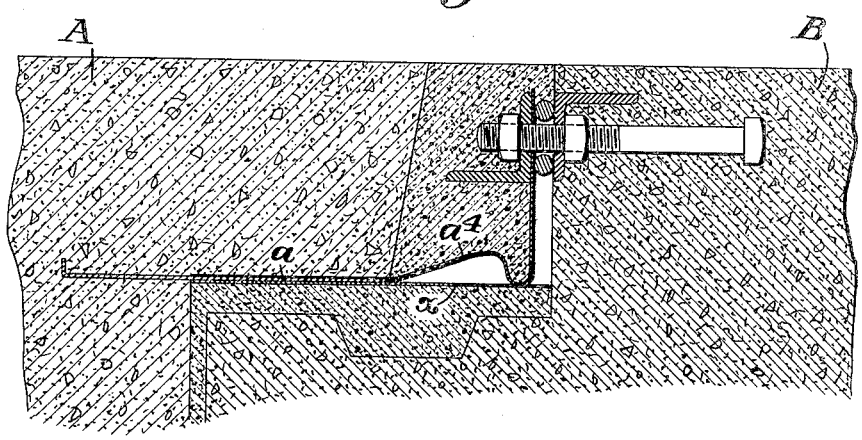

In the accompanying drawing in Figure 1, I have shown a section through a part of two pipe sections, one fitting within the other. Fig. 2 is a view of a modified form.

The ends of the pipe may be of ordinary or any improved construction, A representing what is known as the spigot end, having an overhanging part A' and B the bell end and it is between these ends that my joint is made. The top of the figures represent the inside of the pipe.

I use a cylindrical sheet $a$ of copper or other suitable metal with an outwardly turned end $b$ and embed this in the end A of the pipe as it is formed, as concrete will not adhere to copper or smooth metal and it is necessary to fix the cylinder in the pipe at the time of manufacture to make a positive connection.

The cylinder $a$ projects beyond the end of the part A', preferably covering the space $A^3$ and this extension is formed or otherwise provided with a section $a'$ which may have one or more corrugations in order to give the needed expansion.

The end $a'$ of the cylinder $a$ has an upturned end $a^2$ and this is secured in place against the vertical wall C of the end B of the pipe, being held in place between two angle irons $d$ $d'$ which in turn are supported by a series of bolts $e$, each having one end embedded or anchored in the end of the pipe B and the other end protruding therefrom, nuts $f$ $f'$ holding the angle irons in place while an annular lead washer or ring $g$ is utilized to make a water and gas tight joint.

I provide a shield $a^3$ to cover the bottom of the corrugations $a'$ and prevent them being filled in making the joint and if desired I may use another shield above the corrugations to prevent the space between them from being filled and thus interfere with the expansion action.

In Fig. 2 I show a modified form of the cylinder $a$, in which instead of the corrugated section $a'$ secured to the cylinder, the cylinder has an integral extension $a^4$ with two corrugations to provide the necessary expansion and a piece of tar paper $x$ may be used to prevent the group from filling the corrugation.

In bringing the pipe sections together it is only necessary to connect the flange $a^2$ in place to the wall of the pipe section B.

The space shown at $A^3$ is flushed with cement or other suitable material by pouring in the usual way.

The exposed ends of the pipe sections at the joint opening are painted with asphalt or pitch.

In case of a loose connection my design is so perfected as to permit the placing of the line into operation immediately after the joints are tightened up without waiting for cement to harden.

The space $A^2$ is filled with grout or other material to make the joint complete, but it will be observed that this may readily be removed without injuring the pipe sections if for any reason it is desired to disconnect the sections or tighten up the parts.

The joint is so flexible as to permit deflection in the line in case it is desired to turn a reasonable distance to avoid a physical condition without altering the length of the sections of the pipe.

It is made possible by my improved joint to lay and test the entire line or any part of it before finally filling the joints. This is a very important advantage.

What I claim is:

1. An expansion joint for concrete pipe comprising a metallic cylinder having one end secured in the end of one concrete section and the opposite one secured to the adjacent concrete section, said pipe having an expansible corrugation intermediate of its length, and means for protecting the folds of the corrugations from the filling, substantially as described.

2. An expansion joint for concrete pipe sections comprising a metal cylinder having one end secured to the end of one of the pipe sections and the opposite end flanged and extending at right angles to the cylinder and secured to the face of the adjacent concrete pipe section, said securing means being detachable and including a packing, said cylinder being expansible at a point intermediate of its length, substantially as described.

In testimony whereof I affix my signature.

ALBERT J. BOYLE.